United States Patent [19]
Giorgetta et al.

[11] Patent Number: 5,173,832
[45] Date of Patent: Dec. 22, 1992

[54] ELECTRICAL CIRCUIT, PARTICULARLY AN ELECTRONIC POWER CIRCUIT FOR MOTOR VEHICLE INJECTION SYSTEMS, WITH A FUNCTION FOR THE DETECTION AND DIAGNOSIS OF FAULTS, AND THE RELATED METHOD

[75] Inventors: Valerio Giorgetta; Guido Ghisio, both of Turin, Italy

[73] Assignee: Marelli Autronica SpA, Milan, Italy

[21] Appl. No.: 372,967

[22] Filed: Jun. 29, 1989

[30] Foreign Application Priority Data

Sep. 14, 1988 [IT] Italy ............................ 67816 A/88

[51] Int. Cl.$^5$ ............................................. H02H 3/20
[52] U.S. Cl. ........................................ 361/88; 361/90; 340/660
[58] Field of Search ............... 361/62, 63, 65, 78, 361/79, 88, 90, 93, 102, 42-50; 363/50, 51, 78, 79, 92; 340/640, 650, 662, 663, 660; 318/434

[56] References Cited

U.S. PATENT DOCUMENTS

| | | | |
|---|---|---|---|
| 3,317,794 | 5/1967 | Kotheimer | 361/79 |
| 4,276,591 | 6/1981 | Quick | 363/92 |
| 4,350,956 | 9/1982 | DePuy | 361/88 |
| 4,589,401 | 5/1986 | Karim et al. | |
| 4,618,908 | 10/1986 | Anttila | |
| 4,667,186 | 5/1987 | Bliven | 361/79 |
| 4,736,267 | 4/1988 | Karlmann et al. | |
| 4,803,592 | 2/1989 | Ashley | 361/79 |
| 4,811,136 | 3/1989 | Jones et al. | 361/79 |
| 4,835,651 | 5/1989 | Li et al. | 361/68 |
| 4,979,066 | 12/1990 | Kawata et al. | 361/79 |

FOREIGN PATENT DOCUMENTS 0150492 12/1984 European Pat. Off. .

Primary Examiner—A. Jonathan Wysocki
Attorney, Agent, or Firm—Sughrue, Mion, Zinn, Macpeak & Seas

[57] ABSTRACT

During the piloting of the load, the current intensity and the voltage present in the load are monitored by the comparison of their values with a current threshold and with a window of permissible voltage values. When the voltage is outside the window of permissible values and/or the current falls below its threshold, a fault message is generated and the nature of the fault (open load, short circuit to earth, short circuit to the supply voltage) is also identified by the emission of a corresponding signal of a diagnostic nature. The identification of the faulty stage or stages is also provided for in the case of a circuit including several stages in parallel.

14 Claims, 3 Drawing Sheets

ELECTRICAL CIRCUIT, PARTICULARLY AN ELECTRONIC POWER CIRCUIT FOR MOTOR VEHICLE INJECTION SYSTEMS, WITH A FUNCTION FOR THE DETECTION AND DIAGNOSIS OF FAULTS, AND THE RELATED METHOD

FIELD OF THE INVENTION

The present invention relates in general to electrical circuits and has been developed with particular attention to its possible use in the field of electronic power circuits used for piloting the injection function in internal combustion engines. In this area of application, it is important not only to detect the occurrence of a fault, but also to be able to identify its nature.

BACKGROUND OF THE INVENTION

In general terms, with reference to the case of electronic power circuits used for piloting the solenoid valves of fuel injectors, the occurrence of a fault can be traced back to the appearance of one of the following phenomena:
the breaking of the connection to the injector solenoid valve, which acts as the load of the circuit (open load);
the establishment of a short circuit to earth, or
the establishment of a short circuit to the voltage supply (battery) of the load.

Moreover, if—as is usually the case—there are several power circuits operating in parallel (usually one for each injector) it is also important to be able to provide an indication which identifies the stage or stages where the fault has arisen.

SUMMARY OF THE INVENTION

The object of the present invention is to provide a power circuit which can be integrated easily, even when there are several stages arranged in parallel, and in which the function of detecting and diagnosing a fault within the limits defined above can be carried out particularly simply and reliably without the need for an excessively complicated circuit, and at the same time to provide a robust circuit which can be used in a relatively hostile environment such as a motor vehicle.

According to the present invention, this object is achieved by virtue of a method and device in which a sensor means generates a signal indicative of a fault condition and a signal which assumes a value in accordance with a type of fault condition.

BRIEF DESCRIPTION OF THE DRAWINGS

The invention will now be described, purely by way of non-limiting example, with reference to the appended drawings, in which.

DETAILED DESCRIPTION OF THE PREFERRED EMBODIMENTS

Figure 1:
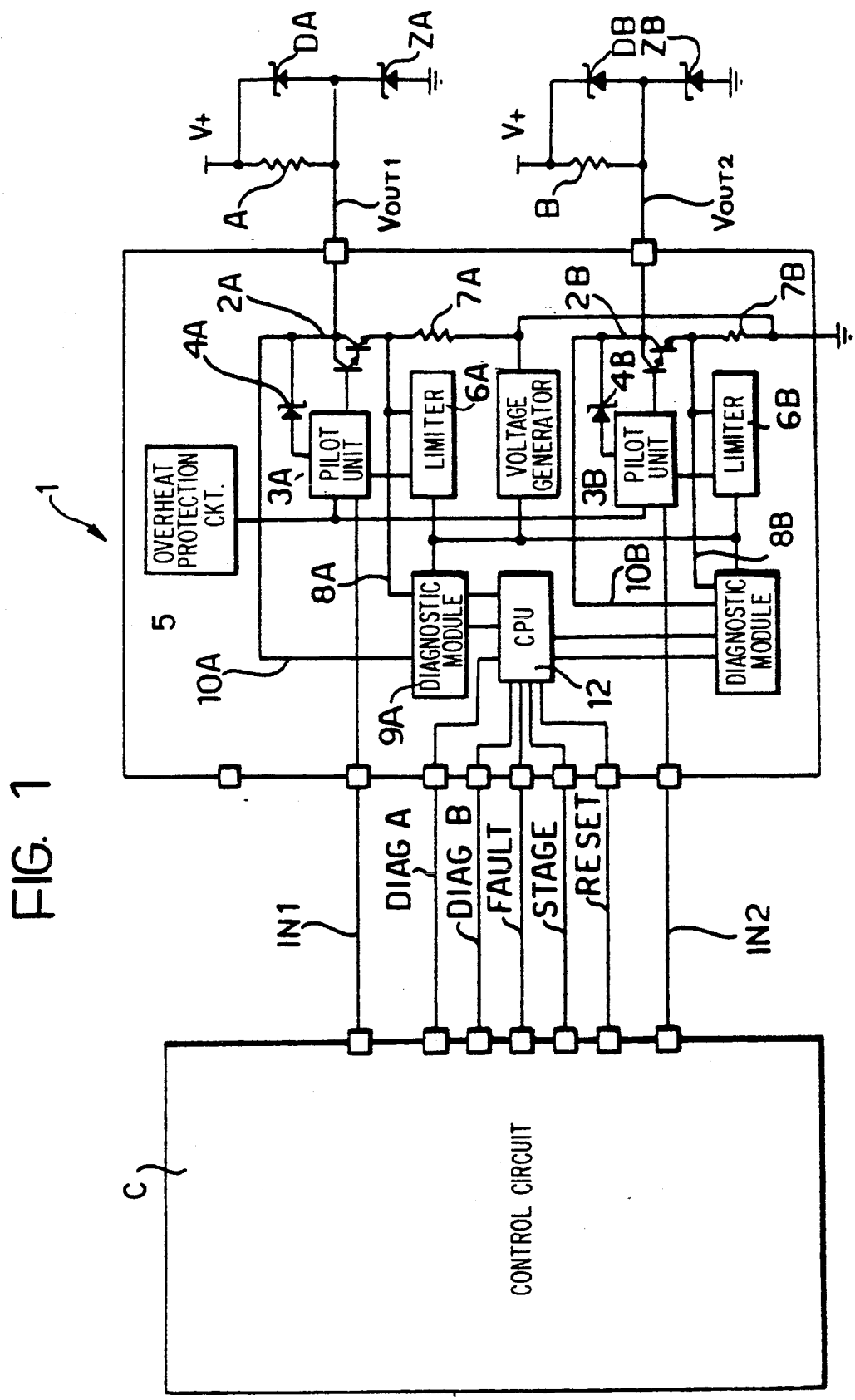
FIG. 1 shows, in the form of a block diagram, a typical configuration of use of a power circuit according to the invention.

In the drawings, an electronic power circuit, generally indicated 1, is intended to be used for piloting the injectors of an internal combustion engine.

In the solutions shown by way of example, it is assumed that the circuit 1 includes two stages in parallel (whose structure will be better described below) for piloting two respective loads A, B constituted by the solenoids or coils of two respective injectors of an internal combustion engine (not illustrated in the drawings).

Each solenoid A, B carries an associated recirculating diode DA, DB or a respective zener diode ZA, ZB for protection against momentary overloading phenomena such as spikes, damping of excess voltage on quenching, etc.

The stages of the circuit 1 are intended essentially to enable the current piloting of the solenoids A, B in dependence on control signals provided by an electronic control circuit C constituted, for example, by a microprocessor, such as a Motorola 68HC11 microprocessor.

The connection between the control circuit C and the power circuit 1 provides for two control lines IN1, IN2 through which the microprocessor C sends to the two stages of the circuit 1 respective excitation signals (usually constituted by rectangular waves) which the stages of the circuit 1 translate into corresponding current piloting signals for the loads A, B.

According to a conventional arrangement in the automotive field, the loads in question are connected between the outputs VOUT1 and VOUT2 of the stages of the circuit 1 and the supply voltage (battery) V+ of the vehicle (or of the injection system).

Five more lines, indicated DIAGA, DIAGB, FAULT, STAGE and RESET respectively, extend between the microprocessor C and the circuit 1.

As will be made clearer below, the FAULT line is intended to send a signal indicative of the fact that there is a fault in the circuit 1 from the circuit 1 to the microprocessor C (as a result of a polling interrogation carried out by the microprocessor or according to a general interrupt logic).

The STAGE line is intended to send a signal identifying the stage or stages with the fault to the microprocessor C.

The Diag A and Diag B lines, however, send information of a diagnostic nature, that is, identifying the kind of fault detected, to the microprocessor C.

Finally, the RESET line enables the microprocessor C to send a general resetting signal to the circuit 1.

In order to avoid too heavy a treatment of the subject, the following description will refer to a power circuit 1 which includes two stages operating in parallel. However, on the basis of circuit developments within the capability of an expert in the art, the invention can be extended to circuits including n stages.

In this case, it is clear that the connections between the microprocessor C and the circuit 1 will provide for respective piloting lines IN1 ... INn and, for example, for several STAGE lines in parallel for conveying the respective identifying signals, or for the use of a single STAGE line on which coded signals are sent according to a general serial format.

According to a known solution, the power circuit 1 (which is preferably produced in the form of a single integrated circuit) comprises, for each stage, a power unit 2A, 2B with transistors, preferably constituted by a Darlington pair, whose common output collector pilots the respective load A, B in dependence on a switching signal applied to the base of the first transistor by a piloting unit 3A, 3B. The latter is in turn activated by piloting signals received from the microprocessor C through the lines IN1 and IN2.

Except where indicated otherwise, the two stages of the circuit 1 are completely identical to each other: in the present description and in the appended drawings, their respective constituent elements are indicated by the same reference numerals or symbols followed by a suffix A or B according to whether they relate to one stage or the other.

A Zener diode 4A, 4B is interposed between each piloting unit 3A, 3B and the output collector of the Darlington pair 2A, 2B for protection against voltage overloads such as those resulting from the disconnection of the battery, etc.

In addition, both the piloting units 3A, 3B are connected, also according to a known solution, to a unit 5 for protection against overheating. The latter is intended to prevent the operation of the circuit 1 when its temperature exceeds a predetermined safety threshold.

Two circuits, indicated 6A, 6B, are provided, also according to a known solution, for limiting the current acting between the emitter of the second transistor of each Darlington pair 2A, 2B and the respective piloting unit 3A, 3B.

The limitation of the current is achieved by the detection of its intensity by means of ammeter resistors 7A, 7B connected between the emitter of the second transistor of the Darlington pair 2A, 2B and earth. In the embodiment illustrated, each transistor 7A, 7B has a resistance value of the order of 100 mOhm, whilst the intensity of the current flowing through it, and hence through the respective load A, B when the respective Darlington pair 2A, 2B is conducting, is of the order of 3.5–4A at the maximum.

The current intensity signal detected by means of the ammeter resistors 7A, 7B is also sent through respective lines 8A, 8B to diagnostic modules 9A and 9B whose structure and function will be described further below.

The voltage level present in the load, that is, in the output lines VOUT1 and VOUT2 connected to the Darlington pairs 2A and 2B, are also sent through respective lines 10A and 10B to the diagnostic modules 9A and 9B. The latter are also connected to a unit 11 for generating reference voltages (for example, voltages of 0.1 volts, 0.4 volts and 2 volts, which are also stabilized against temperature variations) whose function will better be explained below.

Finally, a module for running the diagnostic function, whose role will better be explained below, is indicated 12.

The structure of the diagnostic modules 9A and 9B will now be described.

For simplicity, only the structure of the module 9A will be described, it being understood that the module 9B is exactly the same. In this case also, the elements and lines of the unit 9A are indicated by a numeral or a reference accompanied by the suffix A, whilst the same elements and lines of the module 9B are identified in the drawings by the same numerals or symbols with the suffix B.

Figure 2:
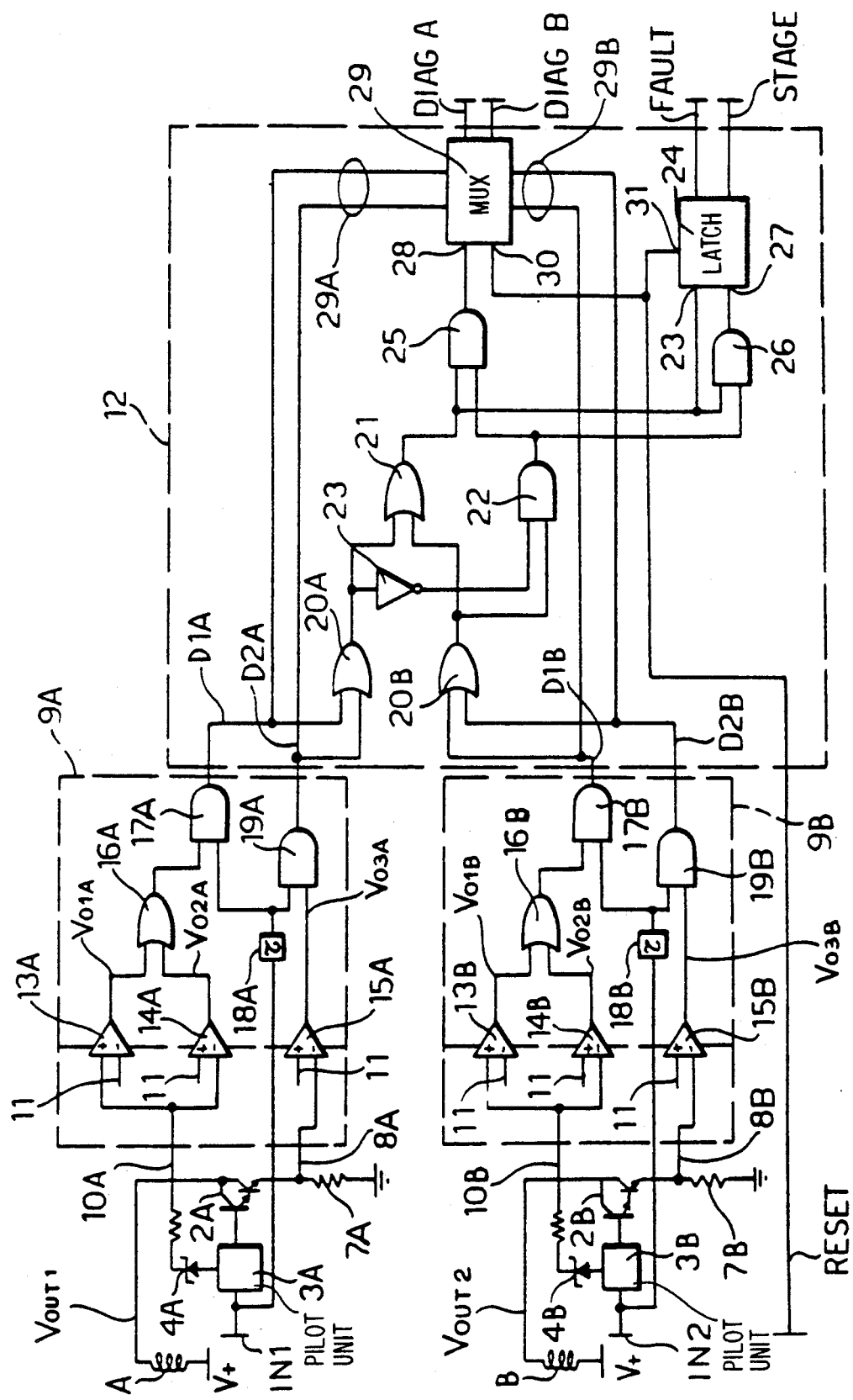
FIG. 2 shows a first possible embodiment of some components of the circuit of FIG. 1, also in the form of a block diagram.

As shown in FIG. 2, three comparators, indicated 13A, 14A, 15A, are connected to the lines 8A and 10A and to the stabilized voltages generated by the unit 11.

More precisely:
the comparator 13A has its positive input connected to the line 10A and its negative input connected to a reference voltage of the order of 2 volts;
the comparator 14A has its positive input connected to a reference voltage of the order of 0.4 volts and its negative input connected to the line 10A, and
the comparator 15A has its positive input connected to a reference voltage of the order of 0.1 volts and its negative input connected to the line 8A.

The outputs of the comparators 13A and 14A, indicated VO1A and VO2A, are connected to the inputs of an OR gate 16A whose output is connected in turn to one of the two inputs of an AND gate 17A. The other input of the latter receives the piloting enabling signal provided on the line IN1 and delayed in a delaying line 18A to avoid buzz.

This signal is also sent to one of the inputs of another AND logic gate 19A which receives the output signal, indicated VO3A, of the comparator 15A at its other input.

In practice, the function of the AND logic gates 17A and 19A is to enable the output signals of the logic gate 16A and the comparator 15A to be propagated to the outputs of the module 9A only in the presence of an excitation signal (logic "1") on the line IN1.

For an understanding of the present description, therefore, the output signals of the module 9A, indicated D1A and D2A, can be regarded to all intents and purposes as equal to the output signals of the OR logic gate 16A and of the comparator 15A.

The selection of enabling these signals to be emitted only in the presence of an excitation on the line IN1 results from the observation of the fact that the need to detect and diagnose a fault exists only when an excitation signal is present.

With reference to the values for the ammeter resistors 7B, 7B given above, it being borne in mind that the v voltage V+ of the battery is usually greater than 6 volts and that, when conducting, each of the Darlington pairs 2A, 2B is traversed (as is the respective load A, B) by a current of the order of 1 to 4 amperes with a collector voltage of between 0.4 and 1.5V, the operation of the diagnostic modules 9A and 9B can be described according to the table shown below.

| STATE | 8A,8B (Volts) | 10A,10B (Volts) | VO1A VO1B | VO2A VO2B | VO3A VO3B | D1A D1B | D2A D2B |
|---|---|---|---|---|---|---|---|
| Normal operation | 0.1–0.4 | 0.4–2 | 0 | 0 | 0 | 0 | 0 |
| S.C. to V+ | 0.4 | >6 | 1 | 0 | 0 | 1 | 0 |
| S.C. to earth | 0 | <0.4 | 0 | 1 | 1 | 1 | 1 |
| Open | 0 | >0.4 | 0 | 0 | 1 | 0 | 1 |

| STATE | 8A,8B (Volts) | 10A,10B (Volts) | VO1A VO1B | VO2A VO2B | VO3A VO3B | D1A D1B | D2A D2B |
|---|---|---|---|---|---|---|---|
| load | | | | | | | |

In particular, it can be seen that, under normal operating conditions, the voltage on the line 10A normally remains within the range from 0.4 to 2 volts, that is, within the window of permissible values established by the comparators 13A, 14A, whilst the ammeter signal present on the line 8A remains above the threshold voltage of the comparator 15A. The signals VO1A, VO2A, VO3A, and hence the output signals D1A and D2A, therefore remain at logic level 0.

In presence of a short circuit to the battery voltage V+, the voltage on the line 8A increases relative to the normal operating conditions, but this does not alter the operating conditions of the comparator 15A or the levels of the signals VO3A and D2A. What does vary, however, is the voltage on the line 10A which practically reaches the voltage of the battery V+, exceeding the threshold voltage of the comparator 13A and falling outside the window of permissible values defined by the comparators 13A and 14A. The signal VO1A passes to logic level "1", causing a corresponding variation in the output signal D1A.

In the presence of a short circuit to earth, however, the current through the Darlington pair, and hence the voltage present in the line 8A, becomes practically zero and thus falls below the threshold level of the comparator 15A. The output signal VO3A of the latter therefore changes the logic level "1", causing a corresponding variation in the signal D2A. The voltage in the load, sensed on the line 10A, also falls to a very low level below the threshold of the comparator 14A, that is, outside and this time below the window defined by the comparators 13A and 14A. There is thus a change in the logic level of the signal VO2A which causes the signal D1A to change to logic level "1".

Finally, in the presence of an open load, with the consequent cancelling out of the current in the load, the voltage on the line 8A falls below the threshold level of the comparator 15A so that the signals VO3A and D2A change to "1". Under these conditions, during the excitation of the Darlington pair, the voltage on the line 10A finally corresponds to the voltage $V_{CESAT}$ of the first transistor of the Darlington pair 2A added to the voltage $V_{BE}$ of the second transistor (approx. 0.1+0.5–0.6 volts), a voltage which falls within the window defined by the comparators 13A, 14A so that the signals VO1A and VO2A remain at logic level 0, as does the output signal D1A.

The four operating conditions defined (normal operation and three different faults) therefore correspond to four different logic values assumed by the pair of signals D1A and D2A.

All the above is also true of the signals D1B and D2B emitted by the module 9B.

By way of summary, normal operation takes place when the voltage present on the lines 10A and 10B falls within the window defined by the comparators 13A, 13B and 14A, 14B, with the current in the load (detected on the line 8A, 8B connected to the ammeter resistors 7A, 7B) above the threshold level fixed by the comparator 15A, 15B.

The occurrence of a short circuit to the positive pole of the battery is detected because of the fact that the voltage $V_{OUT}$ to the load is above the tolerance window established by the comparators 13A, 13B, 14A, 14B whilst the current in the load remains above the reference threshold.

In the presence of a short circuit to earth or of an open load, the intensity of the current in the load falls below the threshold fixed at the comparators 15A and 15B. The two different phenomena are distinguished by detecting whether the voltage $V_{OUT}$ to the load is below the window established by the comparators 13A, 13B, 14A, 14B or not. The voltage falls below the window only in the presence of a short circuit to earth.

In other words, the correct operation of the circuit 1 only takes place when all the signals D1A, D2A, D2A and D2B are at logic level "0". A change of even just one of the signals to logic level "1" indicates that a fault has arisen. The stage in which the fault has occurred can be identified by detecting which of the diagnostic modules 9A, 9B has the output line in which the change to "1" has taken place. The combination of output values (10, 11 or 01) of each module 9A, 9B thus enables the nature of the fault in an individual stage to be identified according to the criteria shown in Table 1 above.

The functions of signalling the fault, of identifying the stage in which it has occurred and of diagnostic analysis thereof is entrusted to the module 12 which is composed essentially of two OR logic gates 20A, 20B that receive the signals D1A, D2A and D1B, D2B respectively, at their inputs.

The outputs of the logic gates 20A, 20B are connected in turn to the inputs of a further OR logic gate 21 and of an AND logic gate 22, in the latter case with the interposition of an inverter 23 in the output line of the gate 20A.

In practice, the output of the gate 21 constitutes a general OR for all the signals output by the modules 9A and 9B: this means that the output of the logic gate 21 goes to level "1" when any of the output lines of the modules 9A, 9B goes to logic level 1 as a result of a fault.

The output of the gate 22, however, assumes different logic values in dependence on whether the fault has occurred in the first stage of the circuit 1 or the second.

In the embodiment illustrated, the output of the gate 22 is in fact at logic level "0" when one of the outputs of the module 9A has changed to level "1", that is, when there is a fault in the first stage of the circuit 1. However, the output signal of the gate 22 goes to logic level "1" when, and only when, the fault is in the second stage of the circuit.

The output signals of the gate 21 (which indicates the occurrence of a fault) is transmitted to one of the inputs, indicated 23, of a LATCH circuit 24 which transmits the FAULT signal to the microprocessor C.

Two AND logic gates are indicated 25 and 26 in the circuit diagram.

The signal identifying the faulty stage is transmitted to the microprocessor C as a STAGE signal, through the logic gate 26 connected to a second input 27 of the latch circuit 24.

The output signal of the gate 22 is applied through the logic gate 25 to the control input 28 of a multiplexer circuit 29 which can transfer onto the output lines DIAGA or DIAGB leading to the microprocessor C:

the signals D1A and D2A (which are applied to a first pair of inputs 29A) when the output signals of the gate 22 indicates that the fault is in the first stage of the circuit 1, and the signals D1B and D2B (which are applied to a second pair of inputs 29B) when the output signal of the gate 22 indicates that the fault is in the second stage of the circuit 1.

Finally, two further inputs of the multiplexer 29 and the latch circuit 24 are indicated 30 and 31 respectively and are connected to the reset line connected to the microprocessor C.

The variation of the signals D1A, D2A, D1B and D2B causes their automatic storage as a result of the use of storage devices of the set-reset type.

The microprocessor C can return the outputs of the multiplexer 29 and the latch 24 to 0 by means of a resetting signal sent on the RESET line. Thus, in the event of the simultaneous or almost simultaneous appearance of faults in both the stages of the circuit 1, the microprocessor C can read the respective fault messages, as well as the diagnostic signals presented on the lines DIAGA and DIAGB, sequentially.

The microprocessor C interprets the signals present on the various lines FAULT, STAGE, DIAGA and DIAGB, and provides for corresponding interventions (such as a visual indication to the outside, the interruption of operation, etc.). The criteria for the organisation of this information by the microprocessor C will not be described in detail herein, because they are not relevant for the purposes of the description and understanding of the present invention and also because of the numerous possible alternative solutions.

Naturally, the logic network illustrated in FIG. 2 represents only one of the many possible solutions for the implementation of the circuit according to the invention.

Figure 3:
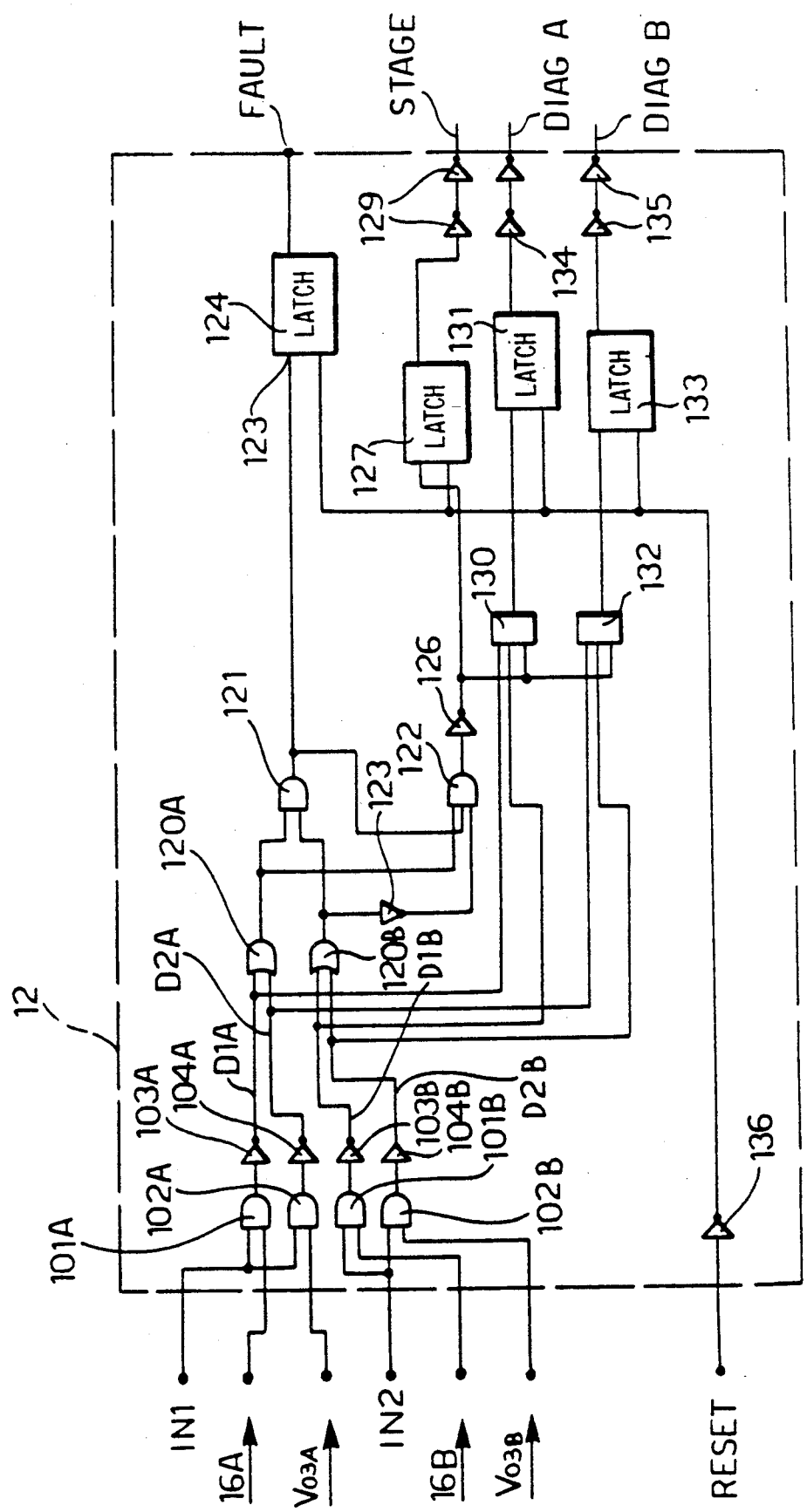
FIG. 3 shows a possible variant of some of the components shown in FIG. 2.

FIG. 3 shows schematically how a functionally similar solution can be produced with the use of NAND and NOR logic gates.

In particular, in the diagram of FIG. 3, the NAND logic gates are indicated 101A and 102A and each receives the enabling signal IN1 at one input and the output signals corresponding to the output signals from the logic gates 16A and to the signal VO3A, respectively, at the other input.

The NAND gates 101A and 102A are connected to respective inverters 103A, 104A whose output logic signals are equivalent to the signals D1A and D2A.

An identical circuit configuration (including similar elements indicated by the suffix B) is provided for processing the output signals of the logic gate 16B and the signal VO3B under the control of the enabling signal IN2.

Two NOR logic gates, indicated 120A and 120B, are substantially comparable, as regards their functions, to the gates 20A, 20B of FIG. 2.

The output signals of the NOR gates 120A, 120B are sent to two further NAND gates 121 and 122 which also have a function more or less comparable to that of the logic gates 21 and 25 of FIG. 2, that is, the generation of a signal indicative of the occurrence of a fault (a signal intended to be sent to a first input 123 of a latch stage 124 for transmission on the FAULT line) and the generation, through an inverter 126 connected in cascade to the gate 122, of a signal identifying the stage of the circuit 1 in which the fault has occurred.

The latter signal is transferred to an input 127 of a latch circuit 128 for transmission, again with the interposition of two inverters 129 connected in cascade, to the STAGE line.

The same signal is also sent as an enabling signal to two further latch circuits each including two stages 130, 131 and 132, 133 which are connected, again through pairs of inverters 134 and 135, to the lines DIAGA and DIAGB which send the diagnostic signals to the service processor.

The latch stages 130, 131 and 132, 133 naturally receive the signals D1A, D2A, D1B and D2B on respective input lines.

Again, substantially as shown in FIG. 2, all the latch stages 124, 128, 131 and 133 which pilot the output lines of the module 12 have a connection to the RESET line (in the specific case through an inverter 136) connected to the microprocessor C.

Naturally, the principle of the invention remaining the same, the forms of embodiment and details of construction may be varied widely with respect to those described and illustrated, without thereby departing from the scope of the present invention.

We claim:

1. An electrical circuit including at least one stage with an output terminal for supplying a respective load, the circuit admitting of a plurality of faulty conditions as well as a normal operating condition, said circuit comprising:

means for generating at least one first signal indicating that the circuit is in one of the plurality of faulty conditions;

means for generating at least one second signal which assumes different values in accordance with the plurality of faulty conditions, respectively, so as to identify which one of the plurality of faulty conditions is present in the circuit;

first sensor means for sensing a voltage applied to the load by the output terminal;

second sensor means for sensing a current applied to the load by the output terminal;

first comparator means, connected to the first sensor means and defining a range of permitted values for a voltage applied to the load during the normal operating condition of the circuit, the first comparator means operable for generating a first logic signal which assumes a first value or a second value in accordance with whether the voltage applied to the load is inside or outside the range of permitted values, respectively;

second comparator means, connected to the second sensor means and defining a range of permitted values for a current applied to the load during the normal operation condition of the circuit, the second comparator means being operable for generating a second logic signal which assumes a first value or a second value in accordance with whether the current applied to the load is inside or outside the range of permitted current values, respectively; and logic processor means, connected to receive the first logic signal and the second logic signal, said logic processor means being operable for generating the at least one second signal with different values in accordance with a distribution of values assumed by the first and second logic signals.

2. The circuit according to claim 1, wherein the circuit includes a plurality of stages, each of said stages having an output terminal for supplying a respective load, and wherein the circuit further comprises means for generating at least one third signal indicating which one of the stages is in a faulty condition.

3. The circuit according to claim 1, wherein the logic processor means generates the at least one second signal with:
- a first value when the first logic signal assume the second value and the second logic signal retains the first value,
- a second value when both the first and second logic signals assume the second value, and
- a third value when the first logic signal retains the first value and the second logic signal assumes the second value.

4. The circuit according to claim 1, wherein the plurality of faulty conditions include the output terminal being disconnected from the load, being short-circuited to ground, and being short-circuited to a voltage supply.

5. The circuit according to claim 1, wherein the first comparator means comprises a window comparator module with respective upper and lower threshold levels defining the range of permitted values for the voltage applied to the load, an output of the window comparator module supplying the first logic signal.

6. The circuit according to claim 1, wherein the second comparator means comprises a single-threshold comparator module defining a lower end of the range of permitted values for the current applied to the load, an output of said single-threshold comparator supplying the second logic signal.

7. The circuit according to claim 1, wherein the logic processor means includes means for sensing that at least one of the first and second logic signals generated by the first and second comparator means associated with each stage of the circuit has changed to the second value and, said sensing means of said processor means generating the at least one third signal when the at least one of the first and second logic signals has changed to the second value.

8. The circuit according to claim 7, further comprising, at least one multiplier having input terminals which are supplied with the at least one third signal and with the first and second logic signals generated by the first and second comparator means associated with each stage of the circuit, and output terminal means to which the first and the second logic signals generated by the first and second comparator means associated with only one of the stages of the circuit are transferred, in accordance with the value assumed by the third signal.

9. The circuit according to claim 1, further comprising a control module having input lines for receiving the at least one first signal and the at least one second signal.

10. The circuit according to claim 9, wherein said control module includes a line for receiving the at least one third signal.

11. The circuit according to claim 1, wherein said circuit is an integrated circuit.

12. A method for detecting the occurrence of a fault in an electrical circuit including at least one stage with an output terminal for supplying a respective load, the circuit admitting of a plurality of faulty conditions as well as a normal operating condition, the method comprising the steps of:
- detecting a voltage and a current applied to the load by the output terminal,
- comparing the detected value of the voltage with a range of values permitted for the voltage during the normal operation of the circuit, and generating a first logic signal which assumes a first value or a second value when the voltage applied to the load is inside or outside the range of permitted values, respectively,
- comparing the detected value of the voltage with a range of values permitted for the current during the normal operation condition, and generating a second logic signal which assumes a first value or a second value when the current applied to the load is inside or outside the range of permitted values, respectively, and
- processing the first and second logic signals, generating at least one first signal which indicates that the circuit is in one of the plurality of faulty conditions, when at least one of the first and second logic signals assumes the second value, and generating at least one second signal which assumes different values in accordance with the distribution of values assumed by the first and second logic signals, the at least one second signal indicating which one of the plurality of faulty conditions is present in the circuit.

13. The method according to claim 12, wherein the at least one second signal is generated with:
- a first value when the first logic signal assumes the second value and the second logic signal retains the first value,
- a second value when both the first and second logic signals assume the second value, and
- a third value when the first logic signal retains the first value and the second logic signal assumes the second value.

14. The method according to claim 13, wherein the circuit comprises a plurality of stages, each of which has an output terminal for supplying a respective load, the method further comprising the step of generating at least one third signal which assumes different values in accordance with which one of the stages of the circuit which has a voltage applied to its load and a current applied to its load, and which has departed from its respective range of values permitted during the normal operation of the circuit, the at least one third signal identifying one of the stages in which a faulty condition has appeared.

* * * * *